(12) United States Patent
Ryan et al.

(10) Patent No.: US 10,897,473 B1
(45) Date of Patent: Jan. 19, 2021

(54) SYSTEM AND METHOD FOR A META SCAN ENGINE

(71) Applicant: Trinity Cyber, LLC, Bowie, MD (US)

(72) Inventors: Stephen Ryan, Severna Park, MD (US); Stefan BARANOFF, Severn, MD (US); John Searles, Linthicum Heights, MD (US)

(73) Assignee: TRINITY CYBER, LLC, Bowie, MD (US)

( * ) Notice: Subject to any disclaimer, the term of this patent is extended or adjusted under 35 U.S.C. 154(b) by 189 days.

(21) Appl. No.: 16/009,919

(22) Filed: Jun. 15, 2018

(51) Int. Cl.
*H04L 29/06* (2006.01)
*G06F 16/951* (2019.01)

(52) U.S. Cl.
CPC ........ *H04L 63/1416* (2013.01); *G06F 16/951* (2019.01); *H04L 63/02* (2013.01); *H04L 63/1425* (2013.01); *H04L 63/20* (2013.01)

(58) Field of Classification Search
CPC . H04L 63/02; H04L 63/1416; H04L 63/1425; H04L 63/20; G06F 16/951
See application file for complete search history.

(56) References Cited

U.S. PATENT DOCUMENTS

| | | | |
|---|---|---|---|
| 7,058,821 B1 * | 6/2006 | Parekh | H04L 63/145 713/194 |
| 2016/0232349 A1 * | 8/2016 | Baeder | H04W 4/12 |

* cited by examiner

*Primary Examiner* — Brandon S Hoffman
*Assistant Examiner* — Thong P Truong
(74) *Attorney, Agent, or Firm* — Jeffri A. Kaminski; Venable LLP (57) ABSTRACT

Systems, methods, and computer-readable storage media for improved data comparison, particularly when scanning large amounts of data for particular conditions or configurations. With respect to cyber-security, this improvement takes the form of receiving a plurality of threat conditions for cyber threats against a networked computer device; identifying commonalities among the plurality of threat conditions by comparing each threat condition in the plurality of threat conditions against the plurality of threat conditions; generating, based on the commonalities, a hierarchy for scanning of the cyber threats; and scanning for the cyber threats according to the hierarchy.

21 Claims, 5 Drawing Sheets

SYSTEM AND METHOD FOR A META SCAN ENGINE

BACKGROUND

1. Technical Field

The present disclosure relates to a system and method for data analysis and identification, and more specifically to an engine which scans data using multiple engines connected in a hierarchical, non-linear combination.

2. Introduction

Scanning data for specific conditions is a processing intensive task which grows exponentially more difficult as the amount of data being processed grows. For example, plagiarism detection software can be used to compare a new document to previously known documents. As the number of previously known documents increases, the number of comparisons required to determine if the new document is an exact copy increases in a linear fashion—that is, if you add more books or papers to the "known" database, the number of additional comparisons required to determine if the new document matches a previous document increases by a similar amount. However, when determining if any given paragraph in the new document matches any paragraph in any of the previous documents, the number of comparisons begins to rapidly increase based on the size of the document being compared and/or any increases to the database of known documents.

As the number of comparisons increases, the processing power and/or time required to adequately compare the data can become prohibitive. For example, in the area of cybersecurity, the number of "known" threats continues to increase almost constantly. To continue to provide real-time threat monitoring of trafficked data as the number of threats continues to increase requires either an immense amount of processing power or an improved method of detecting threats.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

An exemplary method performed according to this disclosure can include: receiving a plurality of threat conditions for cyber threats against a networked computer device; identifying commonalities among the plurality of threat conditions by comparing each threat condition in the plurality of threat conditions against the plurality of threat conditions; generating, based on the commonalities, a hierarchy for scanning of the cyber threats; and scanning for the cyber threats according to the hierarchy.

An exemplary system configured according to this disclosure can include: a processor; and a computer-readable storage medium having instructions stored which, when executed by the processor, cause the processor to perform operations comprising: receiving a plurality of threat conditions for cyber threats against a networked computer device; identifying commonalities among the plurality of threat conditions by comparing each threat condition in the plurality of threat conditions against the plurality of threat conditions; generating, based on the commonalities, a hierarchy for scanning of the cyber threats; and scanning for the cyber threats according to the hierarchy.

An exemplary non-transitory computer-readable storage medium configured according to this disclosure can have instructions stored which, when executed by a computing device, cause the computing device to perform operations including: receiving a plurality of threat conditions for cyber threats against a networked computer device; identifying commonalities among the plurality of threat conditions by comparing each threat condition in the plurality of threat conditions against the plurality of threat conditions; generating, based on the commonalities, a hierarchy for scanning of the cyber threats; and scanning for the cyber threats according to the hierarchy.

DETAILED DESCRIPTION

Various embodiments of the disclosure are described in detail below. While specific implementations are described, it should be understood that this is done for illustration purposes only. Other components and configurations may be used without parting from the spirit and scope of the disclosure.

The present disclosure addresses a meta scan engine which can scan, in a computationally efficient manner, large amounts of data to recognize specific items. Examples of where this technology can be employed include cyber security, genomic testing, plagiarism detection, or any other circumstance where large amounts of data need to be processed, often in a time-sensitive manner. While the technology can be applied to any area where many comparisons need to occur, this disclosure will focus on scanning for cyber threats. In an example deployment, the meta scan engine may be arranged at the edge of the protected network, and examines every frame, packet, or the like that goes into and out from the protected network. Traditionally, to test for multiple threats to a networked system, multiple individual scan engines would each individually scan for specific threats as part of a broader scan. In order for the overall scanning process to be complete, each individual scan engine must complete its assigned task, then report the results of the scan to the overall threat detection system. Such traditional cyber security systems can operate well for a small number of conditions, but when scanning for a large number of conditions begin to reach larger numbers (i.e., one hundred thousand; one million; ten million; or larger), the ability to effectively scan and operate the networked system becomes impaired.

The disclosed meta scanning device acts as a combination of multiple individual scanners or scanning tools, such that when the scan engines are connected, scanning occurs in a more effective and performant manner compared to when those same engines are used individually or are connected in another manner. Specifically, a scanning engine configured as disclosed herein operates more efficiently by requiring less flops to analyze the same amount of data, an efficiency which can be realized in terms of time and/or power. As such, more transaction and communications may be processed in real time, allowing more users to access the underlying system To enable this efficiency, a meta scanning device builds a hierarchy of relationships between individual scanning engines, where the respective engines have parent/child relationships. In addition, the system links these individual scanning engines using logical expressions, such as Boolean operators and symbols of inequality, to define the specific circumstances in which the respective engines should run. By using these relationships and logical expressions, the system can enable engines to run only when needed, and can de-prioritize engines until required. For example, if the system identifies that performance of any specific engine would negatively impact the overall meta scan (that is, the scan of the combination of multiple engines), then the system can modify the default order of the scan such that the negative impact is delayed or eliminated. Likewise, the relationship between parent/child engines can be defined such that a parent engine does not initiate its respective scan until a child engine has completed assigned actions, and the parent engine may adjust actions based on the child engine outputs. For example, if a child engine searches for certain conditions, elements, or features, and those conditions are not found, that may result in the parent engine not performing actions which otherwise would have been performed had the features been found, creating efficiencies that do not exist in prior approaches.

In some configurations, the hierarchical structure of the meta scan system can store the results of "child" scans, then use the recorded states of those outputs in later operations. For example, in a three tier hierarchy, the bottom "basic" level of the hierarchy can be performed such that required operations (such as scans) occur for that level. The middle level of the hierarchy may be configured not to execute until operation of the bottom level is complete, but might not require the data of the bottom level for execution. Instead, the output of the bottom level can be recorded, then used in the (eventual) execution of the top level operations in the hierarchy.

In some configurations, a higher level operation can require a certain number of lower level operations to be performed before initiating execution. For example, a higher level operation can require that two, three, or more lower level operations be completed prior to the higher level operation being instigated. Similarly, in some configurations, the respective branches, operations, and/or scans within the hierarchy of operations can be weighted, such that as a scan occurs it can have a disparate impact upon the overall meta scan. For example, one lower level scan could have a weighted value of "2", another a weighted value of "3", and a third a weighted value of "5." In such an example, the higher level operation may be triggered upon lower level operations having a sum of five or more points.

In this manner, the meta scan system disclosed herein can be used with any API (Application Programming Interface). For example, any scan engine can be used within the hierarchy, regardless of language, scan type, or other factors. Similarly, the meta scan system disclosed herein can be extended to include future scanning methodologies and search for and identify new conditions or data types, and does not rely upon any specific methodology.

To generate the hierarchy, the system can use formulas based on specific situations or contexts of a cyber threat. The formula may be the top level of the hierarchy. The formula includes terms that specify the situation at issue. For example, one threat may be associated with a particular IP address and a specific time window. For such a threat, the formula used to identify the threat may resemble:

Compare (Current IP Address, Known Threat IP Address) AND Compare (Current Time, Known Threat Time Window) Generation of the formulas can be a manual task (i.e., identified and performed by a human being) or can be an automated task. For example, the formulas can be generated by a processor which detects common patterns of errors, but which have not yet been formally identified as threats by supervising users.

Upon receiving the various formulas which identify the individual threat conditions of a given threat, the system generates a hierarchy based on commonalities between respective formulas. Other factors which can be used in building the hierarchy include time required to perform a respective scan (fast versus slow), power required, complexity of the formula, etc.

It is noted that use of the hierarchy system is distinct from traditional, "fast pass" checks which pre-filter a list of conditions, because those pre-filter systems fail to efficiently process when the number of conditions grows large (for example, greater than 100,000). This inefficiency is due, in part, to the way in which current tools define a linear list of potential sets of conditions and then within that set of conditions walk through each individual component.

By contrast, systems built according to this disclosure efficiently scale conditions by implementing a hierarchical structure using logical expressions (such as Boolean operators and less-than/greater-than boundary conditions) to connect terms from distinct scanning engines. For example, two distinct commercially-available scanning engines may have conditions which are common between the two scanning engines. By building a hierarchy using these conditions searched for by all of the respective engines, the hierarchical structure allows for simultaneous evaluation of all the Boolean equations loaded into the system. That is, all of the respective, individual scanners can be deployed simultaneously such that the data is scanned only a single time. An exemplary order could be: data is received which needs to be scanned; the data is stored in a cache; data from the cache is fed into all of the respective individual scanning engines simultaneously, with each scanning engine only receiving the data it needs to perform its respective evaluation; results are received from each respective scanning engine; if needed, additional scanning or evaluations occur based on the individual scanning engine results. In this manner, a definitive list of matched threats can be produced and/or a minimal list of probable matches can be produced. The matched threats can be eliminated and the probable matches can be forwarded to a supervisor for additional evaluation.

Figure 1:
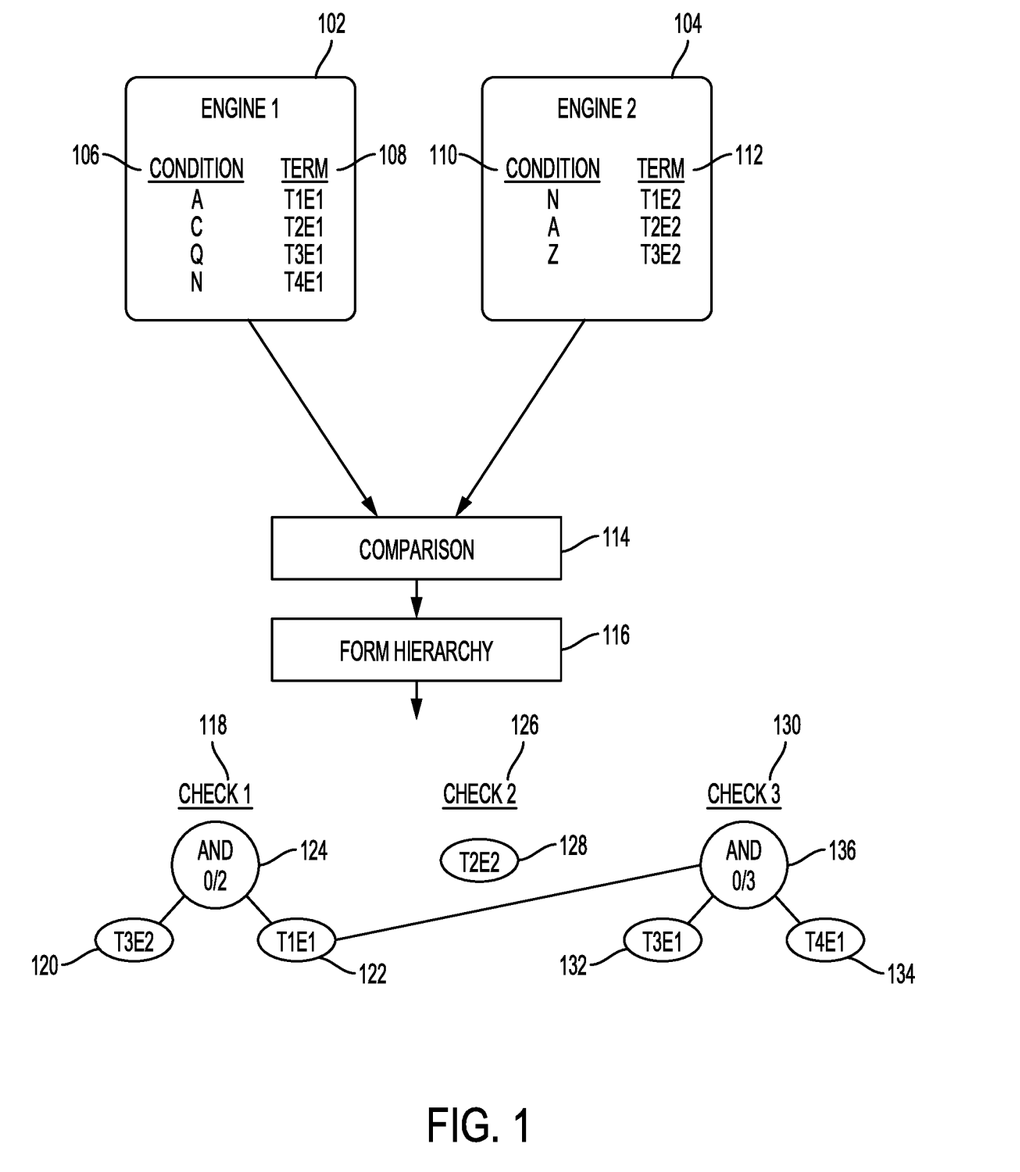
FIG. 1 illustrates an example flowchart of hierarchy formation.

In FIG. 1, an exemplary flowchart for the creation of the hierarchy is generated. In this example, engines (Engine 1 102 and Engine 2 104) are designated as identifying specific cyber security threats. As illustrated, the threat tasked to Engine 1 102 has four conditions 106—A, C, Q, N—each with a corresponding term 108 name: A is T1E1 (Term 1 Engine 1), C is T2E1, etc. Engine 2's 104 assigned threat only has three conditions 110, N, A, and Z, with similar term names 112. By comparing 114 the conditions of each respective threat, the conditions which are common to both threats can be identified, and repeated searching for those conditions can be avoided. In this manner a hierarchy can be formed 116, where the hierarchy identifies the common conditions for respective threats, and allows the system to search for those common conditions first. If the common conditions are found, then the system, using the respective engines, can determine if the additional conditions are present for each respective threat. FIG. 1 concludes by illustrating an example hierarchy for the combined threats illustrated. In this hierarchy, the system has identified three distinct checks which will occur. In check one 118, the system is looking for both term T3E2 120 ("Z") and T1E1 122 ("A"). In check two 126, the system is looking for term T2E2 128 ("A"). In check three 130, the system is looking for three terms: T1E1 122 ("A"), T3E1 132 ("Q"), and T4E1 134 ("N"). The first term, T1E1 122 ("A") is common to the first check 118 and the third check 130. Also, check two 126 is exclusively looking for condition "A", term T2E2 128.

All three checks 118, 126, 130 can be initiated simultaneously, such that the search for conditions 120, 122, 128, 132, and 134 initiate together. The parent Boolean expressions 124, 136 in checks one and three 118, 130 will occur as the results of the lower level conditions are received.

Figure 2:
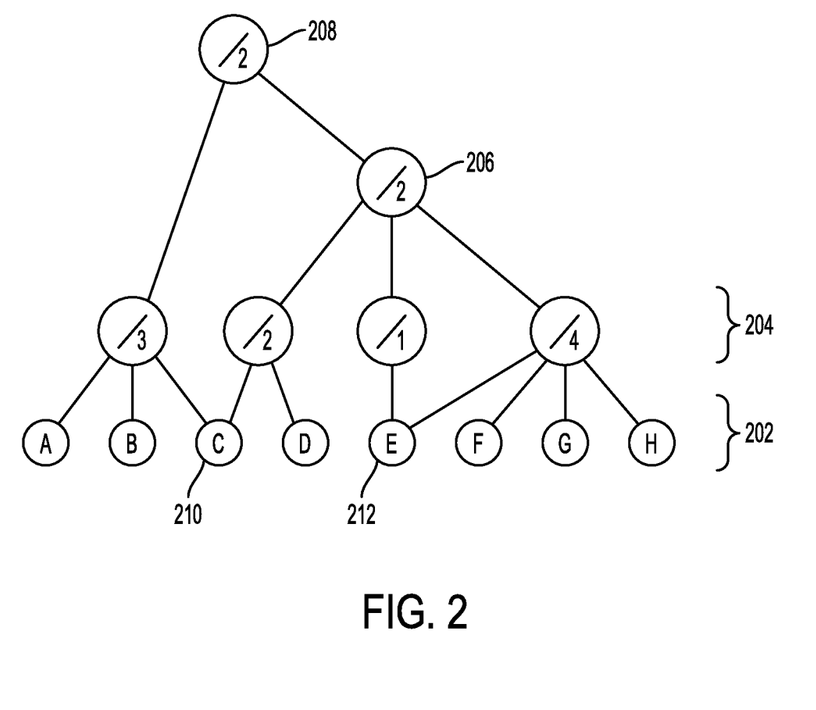
FIG. 2 illustrates an exemplary hierarchy as an acyclic graph.

FIG. 2 illustrates an exemplary hierarchy as an acyclic graph. In this example, there are many conditions 202 which, like the conditions 120, 122, 128, 132, and 134 of FIG. 1, can initiate together. The hierarchy of FIG. 2 has several Boolean expressions 204, 206, 208 which depend on the lowest level conditions 202. Some of the lowest level conditions 210, 212 are connected to multiple parent cases. In this example, each of the respective Boolean expressions in the parent cases 204, 206, 208 reflect a number of lower level conditions which must be met before identifying a threat, initiating a scan, and/or performing some other function.

Figure 3:
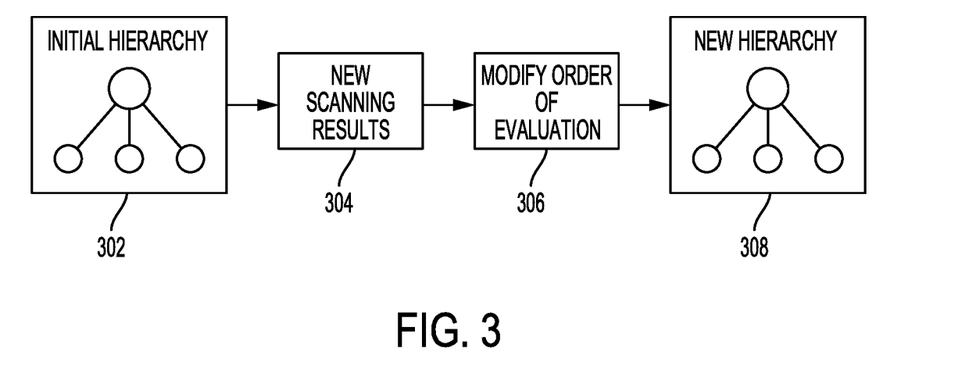
FIG. 3 illustrates modification of the hierarchy.

In some configurations, the meta scan system can form the hierarchy, then modify that hierarchy based on specific conditions found, power requirements, etc. FIG. 3 illustrates modification of the hierarchy based on received results. As illustrated, the system first forms an Initial Hierarchy 302 and initiates scanning for specific conditions. As new scanning results 304 are received, the system modifies the order of evaluation 306, resulting in a new, updated hierarchy 308. Preferably, the system makes these modifications to increase efficiency by removing searches or aspects no longer required.

In one example, the system may identify conditions that are returning a large number of matches. In such a case, the parent node may become overwhelmed, resulting in delays. A stop limit may be set for the conditions. When the stop limit is reached, the condition is deferred until needed. For example, a parent node in the hierarchy may require condition A and condition B to be present. Condition A may be matched at a high rate. The search for condition A may be paused when the stop limit is reached, and condition B is searched for. Unless and until condition B is found, the search for condition A is deferred. At that time the system goes back and looks for condition A.

In another example, some scanning engines may be slow. Such a scan engine may be delayed in running until needed, that is, after the other engines have run and there is an identified need to run the slow engine to search for its respective condition.

Figure 4:
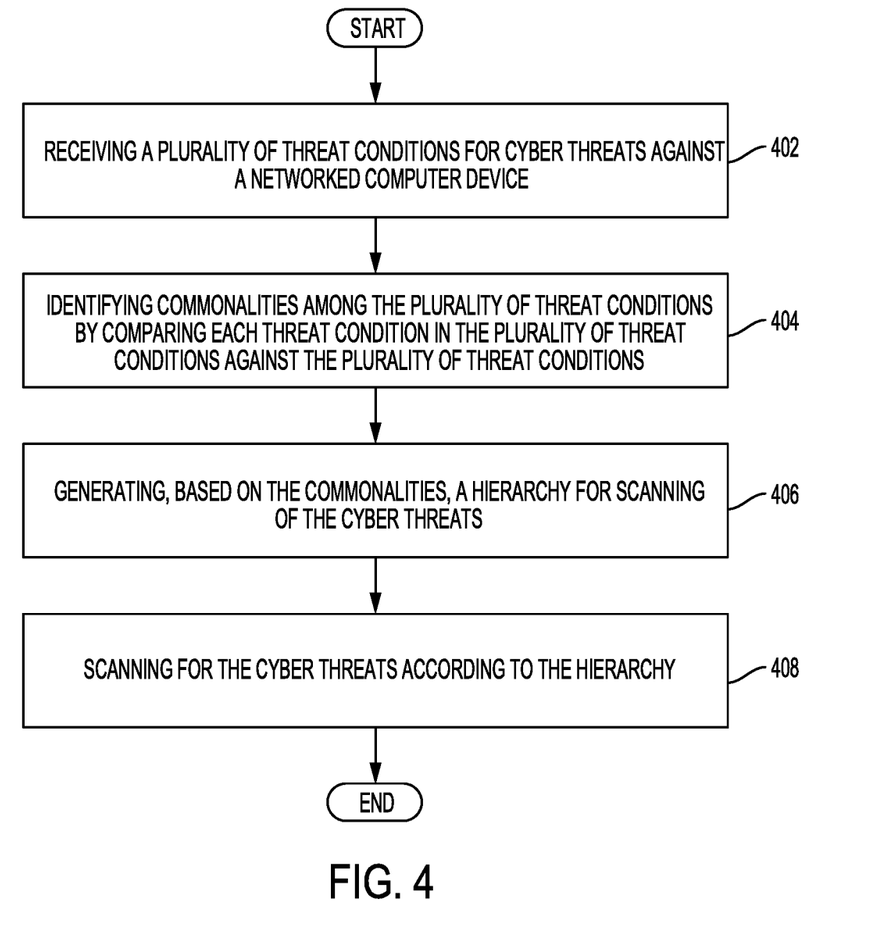
FIG. 4 illustrates an exemplary method embodiment.

FIG. 4 illustrates an exemplary method embodiment. In this example, the system receives a plurality of threat conditions for cyber threats against a networked computer device (402), then identifies commonalities among the plurality of threat conditions by comparing each threat condition in the plurality of threat conditions against the plurality of threat conditions (404). The system generates, based on the commonalities, a hierarchy for scanning of the cyber threats (406) and scans for the cyber threats according to the hierarchy (408).

In some configurations, the scanning for the cyber threats according to the hierarchy can include: identifying data to be scanned for the cyber threats; caching information about the data in a cache; comparing the information within the cache to the plurality of threat conditions in an order determined by the hierarchy, to yield a comparison; tracking detection of the commonalities within the data based on the comparison, to yield commonality detection; and identifying found cyber threats based on the comparison and the commonality detection.

Similarly, in some configurations, the scanning for the cyber threats according to the hierarchy can include: identifying data to be scanned for the cyber threats; caching information about the data in a cache; deploying a plurality of search engines to analyze the information within the cache; receiving search results from the plurality of search engines; and identifying found cyber threats based on the search results according to the hierarchy.

In some cases, the method can be expanded to further include storing states associated with each threat condition, wherein the states associated with each threat condition persist throughout each respective scan iteration.

The hierarchy generated by the system can be a directed acyclic graph, a polytree, a single-parent hierarchy, etc. In some configurations, scanning for the cyber threats according to the hierarchy can be performed on data passing through an Internet firewall or other gateway to the Internet. In some cases, the plurality of threat conditions for each cyber threat in the cyber threats are periodically updated.

Figure 5:
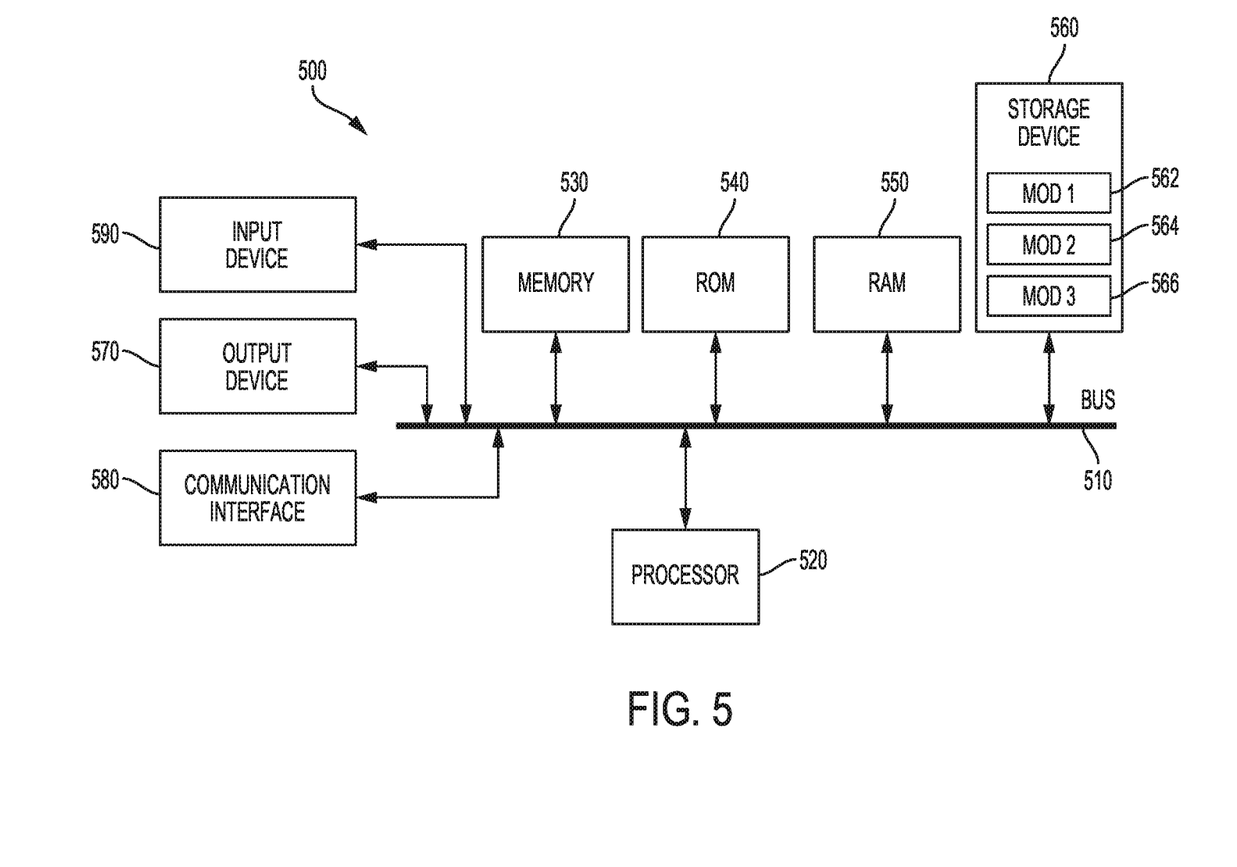
FIG. 5 illustrates an exemplary computer.

With reference to FIG. 5, an exemplary system includes a general-purpose computing device 500, including a processing unit (CPU or processor) 520 and a system bus 510 that couples various system components including the system memory 530 such as read-only memory (ROM) 540 and random access memory (RAM) 550 to the processor 520. The system 500 can include a cache of high-speed memory connected directly with, in close proximity to, or integrated as part of the processor 520. The system 500 copies data from the memory 530 and/or the storage device 560 to the cache for quick access by the processor 520. In this way, the cache provides a performance boost that avoids processor 520 delays while waiting for data. These and other modules can control or be configured to control the processor 520 to perform various actions. Other system memory 530 may be available for use as well. The memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general purpose processor and a hardware module or software module, such as module 1 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output (BIOS) stored in ROM 540 or the like, may provide the basic routine that helps to transfer information between elements within the computing device 500, such as during start-up. The computing device 500 further includes storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer-readable storage media provide nonvolatile storage of computer-readable instructions, data structures, program modules and other data for the computing device 500. In one aspect, a hardware module that performs a particular function includes the software component stored in a tangible computer-readable storage medium in connection with the necessary hardware components, such as the processor 520, bus 510, display 570, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 500 is a small, handheld computing device, a desktop computer, or a computer server.

Although the exemplary embodiment described herein employs the hard disk 560, other types of computer-readable media which can store data that are accessible by a computer, such as magnetic cassettes, flash memory cards, digital versatile disks, cartridges, random access memories (RAMs) 550, and read-only memory (ROM) 540, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 500, an input device 590 represents any number of input mechanisms, such as a microphone for speech, a touch-sensitive screen for gesture or graphical input, keyboard, mouse, motion input, speech and so forth. An output device 570 can also be one or more of a number of output mechanisms known to those of skill in the art. In some instances, multimodal systems enable a user to provide multiple types of input to communicate with the computing device 500. The communications interface 580 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z" or "at least one or more of X, Y, or Z" are intended to convey a single item (just X, or just Y, or just Z) or multiple items (i.e., {X and Y}, {Y and Z}, or {X, Y, and Z}). "At least one of" is not intended to convey a requirement that each possible item must be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:
   receiving a plurality of threat conditions for cyber threats against a networked computer device;
   identifying, via a computer, commonalities among the plurality of threat conditions by comparing each threat condition in the plurality of threat conditions against the plurality of threat conditions;
   generating, via the computer and based on plurality of threat conditions and the commonalities, a hierarchy for scanning of the cyber threats, the hierarchy having lowest layers of threats which are connected to higher layers of threats by the commonalities;
   scanning, via the computer, for all of the lowest layers of threats simultaneously; and
   upon meeting a predetermined number of Boolean conditions during the scanning of the lowest layers, scanning at a higher layer of the hierarchy.

2. The method of claim 1, wherein the scanning for the cyber threats according to the hierarchy further comprises:
   identifying, via the computer, data to be scanned for the cyber threats;
   caching, via the computer, information about the data in a cache;
   comparing, via the computer, the information within the cache to the plurality of threat conditions in an order determined by the hierarchy, to yield a comparison;
   tracking, via the computer, detection of the commonalities within the data based on the comparison, to yield commonality detection; and
   identifying, via the computer, found cyber threats based on the comparison and the commonality detection.

3. The method of claim 1, wherein the scanning for the cyber threats according to the hierarchy further comprises:
   identifying, via the computer, data to be scanned for the cyber threats;
   caching, via the computer, information about the data in a cache;
   deploying, via the computer, a plurality of search engines to analyze the information within the cache;
   receiving search results from the plurality of search engines; and
   identifying, via the computer, found cyber threats based on the search results according to the hierarchy.

4. The method of claim 1, further comprising:
   storing, via the computer, states associated with each threat condition, wherein the states associated with each threat condition persist throughout each respective scan iteration;
   identifying, via the computer, a first threat analysis and a second threat analysis which are both required for a common parent node within the hierarchy; and
   imposing, via the computer, a stop limit on the first threat analysis due to a distinct rate of detection between the first threat analysis and the second threat analysis, such that the first threat analysis is not performed until the second threat analysis is positive while the stop limit is in place.

5. The method of claim 1, wherein the hierarchy is a directed acyclic graph.

6. The method of claim 1, wherein the scanning for the cyber threats according to the hierarchy is performed on data passing through an Internet firewall.

7. The method of claim 1, wherein the plurality of threat conditions for each cyber threat in the cyber threats are periodically updated.

8. The method of claim 1, wherein:
the predetermined number of Boolean conditions comprises a non-entirety portion of a total number of Boolean conditions for threats having a common higher layer within the hierarchy; and
the scanning at the higher layer of the hierarchy identifies additional Boolean conditions.

9. A system, comprising:
a processor; and
a computer-readable storage medium having instructions stored which, when executed by the processor, cause the processor to perform operations comprising:
receiving a plurality of threat conditions for cyber threats against a networked computer device;
identifying commonalities among the plurality of threat conditions by comparing each threat condition in the plurality of threat conditions against the plurality of threat conditions;
generating, based on the plurality of threat conditions and the commonalities, a hierarchy for scanning of the cyber threats, the hierarchy having lowest layers of threats which are connected to higher layers of threats by the commonalities;
scanning for all of the lowest layers of threats simultaneously; and
upon meeting a predetermined number of Boolean conditions during the scanning of the lowest layers, scanning at a higher layer of the hierarchy.

10. The system of claim 9, wherein the scanning for the cyber threats according to the hierarchy further comprises:
identifying data to be scanned for the cyber threats;
caching information about the data in a cache;
comparing the information within the cache to the plurality of threat conditions in an order determined by the hierarchy, to yield a comparison;
tracking detection of the commonalities within the data based on the comparison, to yield commonality detection; and
identifying found cyber threats based on the comparison and the commonality detection.

11. The system of claim 9, wherein the scanning for the cyber threats according to the hierarchy further comprises:
identifying data to be scanned for the cyber threats;
caching information about the data in a cache;
deploying a plurality of search engines to analyze the information within the cache;
receiving search results from the plurality of search engines; and
identifying found cyber threats based on the search results according to the hierarchy.

12. The system of claim 9, the computer-readable storage medium having additional instructions stored which, when executed by the processor, cause the processor to perform operations comprising:
storing states associated with each threat condition, wherein the states associated with each threat condition persist throughout each respective scan iteration;
identifying a first threat analysis and a second threat analysis which are both required for a common parent node within the hierarchy; and
imposing a stop limit on the first threat analysis due to a distinct rate of detection between the first threat analysis and the second threat analysis, such that the first threat analysis is not performed until the second threat analysis is positive while the stop limit is in place.

13. The system of claim 9, wherein the hierarchy is a directed acyclic graph.

14. The system of claim 9, wherein the scanning for the cyber threats according to the hierarchy is performed on data passing through an Internet firewall.

15. The system of claim 9, wherein the plurality of threat conditions for each cyber threat in the cyber threats are periodically updated.

16. A non-transitory computer-readable storage medium having instructions stored which, when executed by a computing device, cause the computing device to perform operations comprising:
receiving a plurality of threat conditions for cyber threats against a networked computer device;
identifying commonalities among the plurality of threat conditions by comparing each threat condition in the plurality of threat conditions against the plurality of threat conditions;
generating, based on the plurality of threat conditions and the commonalities, a hierarchy for scanning of the cyber threats, the hierarchy having lowest layers of threats which are connected to higher layers of threats by the commonalities;
scanning for all of the lowest layers of threats simultaneously; and
upon meeting a predetermined number of Boolean conditions during the scanning of the lowest layers, scanning at a higher layer of the hierarchy.

17. The non-transitory computer-readable storage medium of claim 16, wherein the scanning for the cyber threats according to the hierarchy further comprises:
identifying data to be scanned for the cyber threats;
caching information about the data in a cache;
comparing the information within the cache to the plurality of threat conditions in an order determined by the hierarchy, to yield a comparison;
tracking detection of the commonalities within the data based on the comparison, to yield commonality detection; and
identifying found cyber threats based on the comparison and the commonality detection.

18. The non-transitory computer-readable storage medium of claim 16, wherein the scanning for the cyber threats according to the hierarchy further comprises:
identifying data to be scanned for the cyber threats;
caching information about the data in a cache;
deploying a plurality of search engines to analyze the information within the cache;
receiving search results from the plurality of search engines; and
identifying found cyber threats based on the search results according to the hierarchy.

19. The non-transitory computer-readable storage medium of claim 16, the computer-readable storage medium having additional instructions stored which, when executed by the processor, cause the processor to perform operations comprising:
storing states associated with each threat condition, wherein the states associated with each threat condition persist throughout each respective scan iteration;
identifying a first threat analysis and a second threat analysis which are both required for a common parent node within the hierarchy; and
imposing a stop limit on the first threat analysis due to a distinct rate of detection between the first threat analysis and the second threat analysis, such that the first threat analysis is not performed until the second threat analysis is positive while the stop limit is in place.

20. The non-transitory computer-readable storage medium of claim 16, wherein the hierarchy is a directed acyclic graph.

21. The non-transitory computer-readable storage medium of claim 16, wherein the scanning for the cyber threats according to the hierarchy is performed on data passing through an Internet firewall.

\* \* \* \* \*